United States Patent [19]
Mabey

[11] Patent Number: 5,448,752
[45] Date of Patent: Sep. 5, 1995

[54] TELECOMMUNICATIONS SYSTEM

[75] Inventor: Peter J. Mabey, Comberton, England

[73] Assignee: U.S. Philips Corporation, New York, N.Y.

[21] Appl. No.: 44,140

[22] Filed: Apr. 8, 1993

[30] Foreign Application Priority Data

May 22, 1992 [GB] United Kingdom ............. 9210971

[51] Int. Cl.$^6$ ............................................. H04B 1/00
[52] U.S. Cl. ........................ 455/33.1; 455/34.1; 455/34.2; 455/56.1; 455/89
[58] Field of Search ............ 455/33.1, 33.2, 33.4, 455/34.1, 34.2, 54.1, 56.1, 89; 379/58–59, 60

[56] References Cited

U.S. PATENT DOCUMENTS

| 5,109,528 | 4/1992 | Uddenfeldt | 455/33.2 |
| 5,203,010 | 4/1993 | Felix et al. | 455/33.2 |
| 5,276,906 | 1/1994 | Felix | 455/33.2 |

OTHER PUBLICATIONS

A Signalling Standard For Trunked Private Land Mobile Radio System, MPT 1327 Jan. 1988, 7-1 through 7-10.

*Primary Examiner*—Edward F. Urban
*Assistant Examiner*—Andrew Faile
*Attorney, Agent, or Firm*—Leroy Eason

[57] ABSTRACT

In a mobile radio system wherein a common group call is concurrently transmitted by several primary stations, each primary station includes in the structure of the call the identities of other primary stations which are transmitting the same call. In a TDMA system these identities may be transmitted in a time slot of a dedicated frame F, such as a control slot C, a ramp slot R, or an associated control slot AC. When the quality of the call as received by a mobile secondary station deteriorates, handover to the best available primary station transmitting the same group call can therefore be effected directly by the secondary station without the need for a signaling exchange with the primary stations involved. The invention is also applicable to FDMA systems.

10 Claims, 2 Drawing Sheets

TELECOMMUNICATIONS SYSTEM

BACKGROUND OF THE INVENTION

1. Field of the Invention

The present invention relates to a telecommunications system having particular, but not exclusive, application to a multiple primary station mobile radio system capable of providing multiple-participant communications with hand-over between primary stations of a call-in-progress.

2. Description of the Related Art

A mobile radio system can use handover to ensure continuity of calls in progress as mobile secondary stations move between the coverage areas of different fixed primary stations. Trunked mobile radio systems, for example MPT 1327 published by the DTI London, have been known for some time that permit communication between more than two participants in a call. Such calls are typically referred to as group calls. When a number of primary stations and secondary stations are involved in group calls the signalling requirements as primary stations hand-over calls involving mobile secondary stations can, using known techniques, become high enough to degrade system performance or require excessive allocation of frequency resource to control signalling.

SUMMARY OF THE INVENTION

It is an object of the present invention to provide a mobile radio system capable of conducting group call handover with a reduced signalling overhead.

According to the present invention, there is provided a telecommunications system comprising a plurality of geographically separate fixed primary stations having transmitting and receiving means, and at least one secondary station having transmitting and receiving means, the system being arranged to transmit the same call from at least two primary stations. Each of the primary stations is further arranged to supply to their respective transmitting means the identity of at least one of the other primary stations which are transmitting the same call. The secondary station comprises storage means to store that at least one primary station identity.

Means for supplying the identities of the other primary stations which are transmitting the same call would normally be disposed at a system central control site.

Systems are known, for example that described in MPT 1327, which provide information to secondary stations, independently of a call in progress, of further primary stations in the area. This enables secondary stations to establish an alternative radio link should the one they are currently using fail. The present invention, however, is directed to a system in which information relating to further primary stations is transmitted to secondary stations within calls and, more specifically, to systems transmitting group calls from more than one primary station. Only those further primary stations transmitting the same call are identified, and the secondary station may be arranged to handover a call between primary stations without any signalling exchange between itself and either of the primary stations. A geographical limitation may, of course, be placed on the information relating to further primary stations, in other words, other primary stations carrying the same call which are more than one cell distant from each particular primary station need not be identified.

The system in accordance with the present invention provides for at least one mobile or portable secondary station to be kept informed of at least one alternative primary (base) station which is transmitting the same message or carrying the same call, which call may be either speech or data. As a minimum this might consist of a frequency value, a channel identity or a primary station identity code. If the radio link which the secondary station has with a particular primary station should deteriorate, a new link may be formed quickly and without requiring a signalling exchange between primary and secondary stations. The invention is applicable to both TDMA and FDMA systems.

Typically there will be more than two primary stations carrying the same call and some form of comparison and/or selection may be carried out within the secondary station to determine which (if any) of the possible alternative radio links should be used. In one system, for example, the secondary station may have a particular time slot or even a dedicated receiver with which to assess the quality of the signal received from the alternative primary stations. This assessment may be performed in response to a deteriorating radio link or continuously so that when the link does deteriorate the optimum available alternative link is known and can be used almost instantaneously. The secondary station may perform an assessment of alternative links sequentially and store the details of these alternatives in a list arranged to identify the relative qualities of these alternative links, in other words with the best alternative at the top of the list. Alternatively, as the radio link deteriorates the secondary station may simply try to form a link with a different primary station without any attempt at a quality comparison.

The necessary details concerning alternative primary stations may be transmitted at a number of different locations within a signal transmitted by a primary station. A complete list of alternative stations, for example could be transmitted periodically or the list could be sub-divided and transmitted as smaller lists or even individual station identities. The latter option has the possible advantage that an extended time slot in the transmission need not be provided since the identities could be fitted into a small space. In a TDMA system, for example, there is usually a small time slot in each frame known as a ramp slot, provided to allow the secondary stations, when in transmitting mode, to increase their transmitter output power. The primary station, generally transmitting continuously, does not need this slot for this purpose and could thus convey alternative site information during this time slot to secondary stations which are in the receiving mode.

The present invention also relates to a primary station for use in a communications system in accordance with the present invention, comprising transmitting and receiving means, wherein the station further comprises means for supplying to its transmitting means the identity of at least one other primary station transmitting the same call.

Such a primary station may be further provided with means to supply its transmitting means with information identifying. This would be advantageous in a group call, for example, where one of the participants is temporarily out of radio contact and so did not receive the cleardown signal transmitted at the end of the call. If the call identity is transmitted by the primary stations, the risk of such a participant inadvertently joining a later call set-up on the same channel could be avoided.

The present invention further relates to a secondary station for use in a communications system in accordance with the present invention, comprising transmitting means and receiving means, and channel storage means for storing the identity of at least one other primary station transmitting the same call in the system.

As mentioned previously, such a secondary station may be arranged to measure and store the quality of a signal received from each of the alternative primary stations transmitting the same call. Such a secondary station may include a dedicated receiver for this purpose, particularly in the case of an FDMA system. Means may be provided to control the receiving means of the secondary station to receive the message from an alternative primary station when the quality of the signal received from an initial primary station deteriorates. The transfer of reception between an initial and an alternative primary station may be arranged to be performed only where the signal quality received from the alternative primary station exceeds that received from the initial primary station by a predetermined amount. This effectively provides a degree of hysteresis that should prevent the receiver within a secondary station alternating rapidly between transmissions from different primary stations whose respective received qualities are very nearly equal.

BRIEF DESRIPTION OF THE DRAWINGS

The present invention will now be explained and described, by way of example, with reference to the accompanying drawings, in which:

FIG. 1 shows a block schematic diagram of a portion of a mobile radio system to which the present invention is applicable, FIG. 2 shows a block schematic diagram of a primary station for use in a mobile radio system in accordance with the present invention, FIG. 3 shows a block schematic diagram of a secondary station which is a portable (or mobile) unit in accordance with the present invention, FIG. 4 shows a schematic representation of a signal transmitted by the system with respect to time.

DESCRIPTION OF THE PREFERRED EMBODIMENTS

Figure 1:
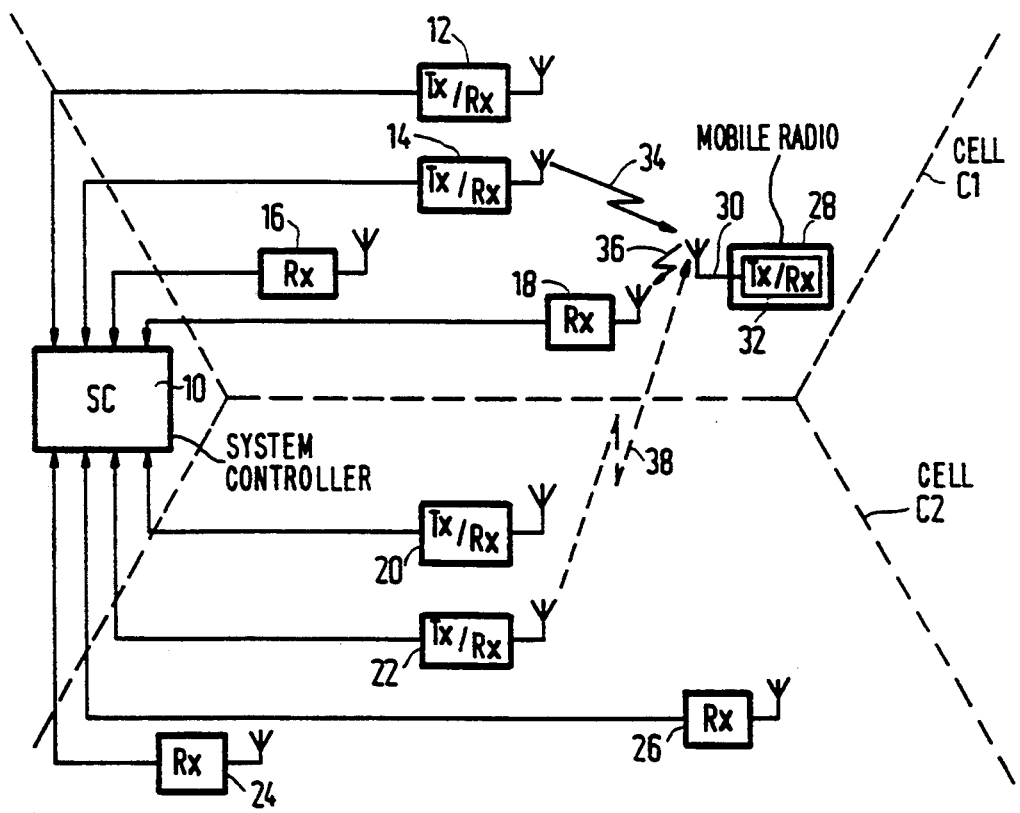

In FIG. 1 a system controller (SC) 10 is connected by mono-directional or bi-directional landline links, as appropriate, to a number of transceivers (Tx/Rx) and receivers (Rx). For the purposes of this example the system controller is shown to govern only two cells C1,C2 of a mobile radio system. Cell C1 comprises a first transceiver 12, a second transceiver 14, and first and second receivers 16,18 which are all provided with antennas. The two transceivers 12,14 are co-sited and operate on different frequency channels. The receivers 16,18 are also co-sited and operate on a different frequency channels but are located at a distance from the transceivers 12,14. Further transceivers and receivers will typically be provided within the cell. Similarly, the cell C2 comprises first and second transceivers 20,22 and first and second receivers 24,26, although again further transceivers and receivers may be provided depending on the size of the system. Also shown in the Figure is a mobile radio 28 comprising an antenna 30 and a transceiver 32. Some possible signal paths between the mobile radio transceiver 32 and the other transceivers in the mobile radio system are indicated as zig-zag lines 34,36,38.

In operation the mobile radio system will establish a bi-directional radio link 34,36 with the mobile transceiver 32. The transmitter included at a primary station transceiver 14 will generally be more powerful than that of the transceiver 32 and will thus have a greater range, typically the whole of the cell C1. The transmitter in a mobile unit, however, will generally have a smaller range and hence the receivers 16,18 (and others) are provided geographically distant in the cell C1 from the transceivers 12,14 to receive these weaker signals. The mobile unit is shown transmitting to the receiver 18 and receiving from the transceiver 14. As the mobile transceiver moves away from the transceivers 12,14 or is shielded from their transmissions, the quality of the radio signals received by the mobile and the base station respectively will deteriorate and radio contact may need to be established with the primary station in another cell, for example cell C2. In order to enable the portable unit to determine whether to establish an alternative radio link, a measure of the quality of one or more possible alternative links may be made.

The mobile radio system shown is currently carrying a two cell group call. Thus, in this example, primary stations of both cell C1 and cell C2 are transmitting the same call by means of their transceivers 14,22 respectively. In addition the signal from transceiver 14 contains the identity of transceiver 22 in cell C2 and the signal from transceiver 22 contains the identity of transceiver 14 in cell C1. How these Signals are arranged to contain these identities will be explained subsequently with reference to FIG. 4. During a call, while the mobile unit is in cell C1, its transceiver 32 receives the identity of transceivers 22 in cell C2 embedded in the signal from transceivers 14 in cell C1, and measures the quality of the signal available from the transceiver 22 in cell C2 as depicted by the broken line 38. When the quality of the signal received by the mobile unit from transceivers 14 in cell C1 deteriorates, the same alternative sources of the signal will be known to that unit. If the call is being transmitted in a number of cells, at least those alternative primary station identities relating to adjacent cells will be transmitted by each primary station. The receiver at the mobile unit is provided with means (not shown) arranged to store these identities.

The mobile radio system is assumed to operate in a TDMA mode and the receiver of the mobile unit is re-tuned during time periods when it is not receiving signals from the primary station in cell C1 to monitor the quality of possible alternative radio links by receiving signals from the primary stations of other cells transmitting the same call. Another receiver may be provided at the mobile unit to perform the quality monitoring, particularly in the case of an FDMA system.

Figure 2:
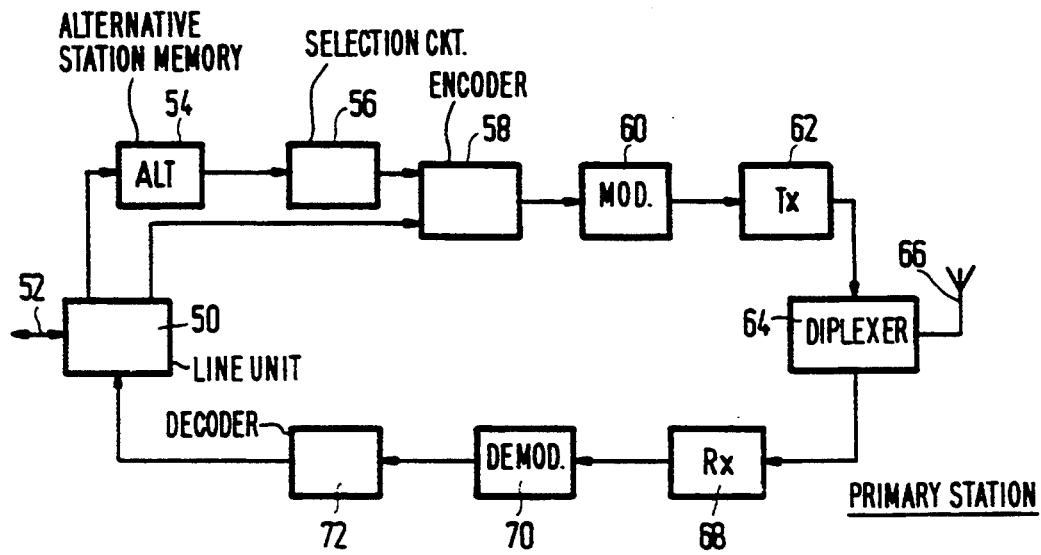

FIG. 2 shows a block schematic diagram of a primary station transceiver in accordance with the present invention. A line unit 50 communicates with the system controller 10 (FIG. 1) via a landline 52. From the system controller the transceiver is supplied with both a signal to be transmitted and the identities of alternative primary stations transmitting the same signal. The line unit 50 feeds the signal to be transmitted to an encoder 58 and feeds the aforesaid identities to an alternative station memory (ALT) 54. A selection circuit 56 is coupled to an output of the ALT 54 for providing the alternative station identities one at a time to the encoder 58. As will be explained with reference to FIG. 4, the alternative station identities may be transmitted together, in which case the selection circuit 56 is not required. The encoder 58 is operable to add redundancy to the signals to be transmitted and supplies the encoded signals to a modulator 60, for example a 16 Quadrature Amplitude Modulator (16-QAM). The output of the modulator is fed to a transmitter (Tx) 62 which provides an R.F. signal to a diplexer 64 which in turn is coupled to an antenna 66.

The diplexer 64 is also connected to a receiver (Rx) 68 which receives incoming radio signals via the antenna 66 and which receiver has an output connected to a demodulator 70. The output of the demodulator 70 is fed to a decoder 72 having an output connected in turn to the line unit 50 for communication to the system controller 10 (FIG. 1).

Figure 3:
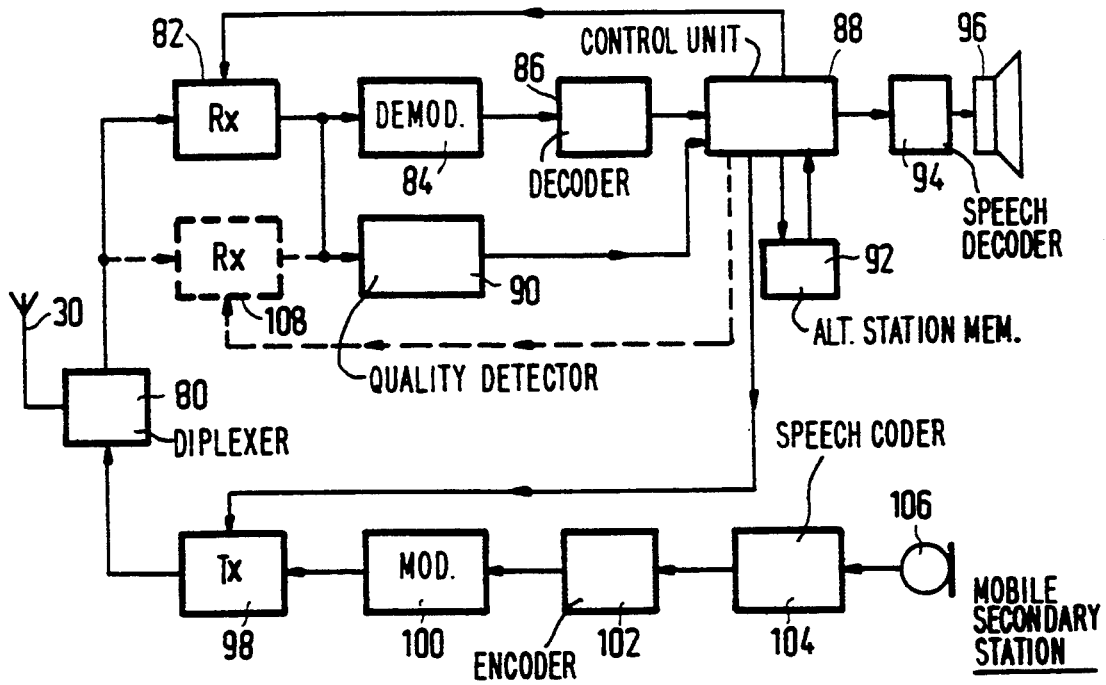

FIG. 3 shows a block schematic diagram of a mobile secordary station having a transceiver for use in the system shown in FIG. 1. An antenna 30 is connected to a diplexer 80 which in turn is connected to a receiver (Rx) 82 also having a control input fed from a control unit (CNTL) 88 and an output connected to a demodulator 84 and to a signal quality detector 90. A demodulated output from the demodulator 84 is fed to a decoder 86 whose decoded output is fed to the control unit 88. The control unit is operable to separate the alternative station information from the signals transmitted with it in a call. The alternative station information is fed to an alternative station memory (ALT) 92 which has a bi-directional connection to the control unit 88. The transmitted signal is fed to a speech decoder 94 whose output is fed to a loudspeaker or other transducer 96. The control unit 88 also provides a control signal to the receiver 82 and is provided with a signal quality indication from the detector 90. When the receiver 82 is not actually receiving a signal from the primary station with which it is currently communicating it may be re-tuned in response to a signal from the control unit 88 to the frequency of an alternative primary station which is carrying the same call. The quality of the signal received from that primary station is also measured by the detector 90 and it supplies a signal quality indication to the control unit 88. The control unit 88 may store that quality indication with the alternative station identity in memory 92 or, for example, it may compare such quality indication with a stored quality indication for another alternative station and only store the identity and quality of the signals received from the most favourable of the alternative primary stations. The control unit 88 then provides a control signal to the receivers 82 to cause it to re-tune to the originally received signal. If the signal received from an alternative primary station is of poorer quality than from the original one, it is not necessary to store its identity.

The transceiver also comprises a microphone 106 connected to a speech coder 104 which digitises the speech using any suitable technique such as vocoding. The digitised speech is fed to a channel encoder 102 whose output signal is modulated by a modulator 100. The modulated signal is fed to a transmitter (Tx) 98 which transmits the signal via the diplexer 80 and the antenna 30. The transmitter 98 can also be provided with a control signal by the control unit 88 to retune it to the appropriate frequency when the quality of the received signals causes the receiver 82 to be re-tuned to another frequency.

Some mobile radio systems use registration by the mobile and portable stations to assist in their location when they are being called. The present invention may be applied to such systems and may reduce overall signalling overhead as well as making the signalling less time-critical. The handover of the portable transceiver to another primary station as described above will generally be due to the portable having moved out of the cell to which the original primary station belongs. There is no need, however, for the portable station to re-register with the primary station in the new cell because it is still participating in the same call. There is a possibility that the portable station will move again from the second cell to a third or fourth cell and so on during the call. The re-registration of the portable secondary station may be delayed until the end of the call, but then only one re-registration will be required per secondary station. Should the secondary station have returned to its original cell by this time, of course, no re-registration will be required. Re-registration requests may be grouped together at the end of a call but re-. registration outside of a call is less time-critical than that within a call, and can be accomodated by an efficient random access protocol.

The secondary station described above is appropriate for use in a TDMA system but may not be appropriate for use in a FDMA system where the signals are communicated substantially continuously. One possible solution is to allow for a signal quality sampling slot in the system's signals. No signals would need to be received during this portion of time for the normal operation of the system but the transmitters at the primary stations would continue to transmit a signal to permit the secondary stations to make signal quality measurements.

Such a solution, while requiring little additional hardware, is inefficient in terms of communications channel usage. That may be remedied by providing a further receiver (Rx) 108, shown in broken lines at the secondary station. Rx 108 has an input connected to the output of the diplexer 80 in the same manner as the main receiver 82 and an output connected to the signal quality detector 90. The connection between the Rx 82 and the device 90 is broken. The reception frequency of the Rx 108 is governed by the control unit 88 similarly to that of the Rx 82. The most significant difference lies in the fact that the main Rx 82 remains tuned to the same frequency unless definitely tuning to a new channel, while the Rx 108 measures the signal qualities of all of the possible alternative signals at regular intervals. The control unit 88 may be operable to select an alternative primary station for the secondary station to communicate with whenever a better link is found to be available or only when there is a noticeable deterioration of the quality of the signal received from the present primary station. The latter option may be preferable because it is likely to result in fewer handovers.

Figure 4:
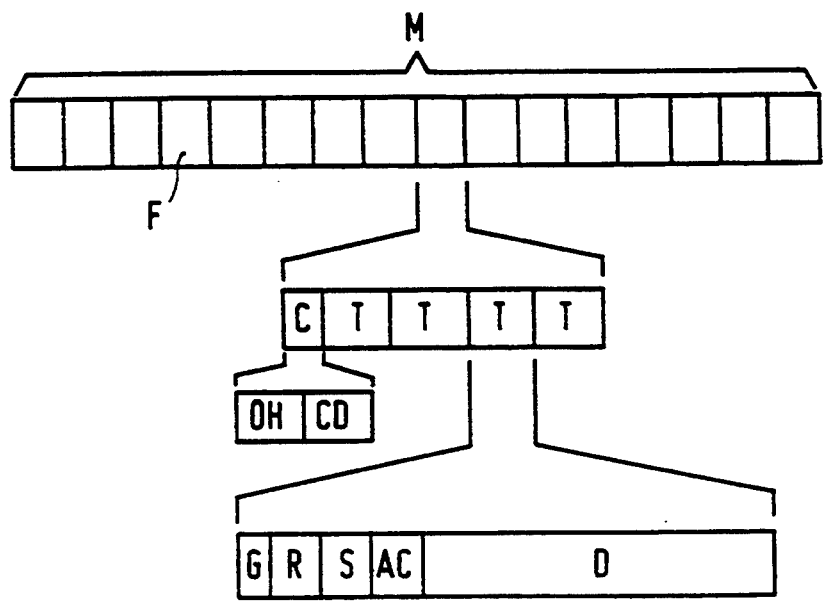

FIG. 4 shows an overview diagram of a portion of a signal from a TDMA mobile radio system in which a list of alternative base or primary stations transmitting the same call may be included. The signal is subdivided into a number of frames F of equal duration, each of which comprises 2640 bits. Sixteen consecutive frames called a multiframe M. The frames F are each comprise a control slot C, 240 bits in length, and four traffic slots T, 600 bits in length. The control slot C is subdivided into an overhead slot OH and a control data slot CD, 120 bits in length each. The traffic slot T is sub-divided into a guard slot G, 8 bits in length, a ramp slot R, 40 bits in length, a synchronisation slot S, 72 bits in length, an associated control slot AC, 24 bits in length and a traffic data slot TD, 456 bits in length. One frequency channel thus provides up to four time-division multiplexed (TDM) signals for digitized speech or data transmission.

The slot C is the primary means for transmission of control signalling. One of the transmitted frequency channels from a primary station site will be designated the primary frequency channel. The secondary stations within the cell served by that primary station will be arranged to receive the signals transmitted during this control slot on this frequency channel so that the secondary stations may be paged at any time by the system controller while allowing power consumption to be kept low at the secondary stations. Extra control signalling may be accomodated within the corresponding slots of other frequency channels or by sacrificing one of the traffic slots T to provide an extended control channel. The guard slot G is provided to allow a short time between adjacent transmissions from secondary stations and reduce the likelihood of these transmissions overlapping. The ramp slot R is provided to allow the transmitter of a secondary station to attain full power (or a substantial proportion of full power) after it is activated in a particular traffic slot. The associated control channel is a lower speed control channel which may, for example, be used for emergency call interrupt signals.

In a TDMA system with four traffic time slots per frame the minimum alternative primary station information needed is the identity of the channel or frequency of transmission requiring, for example, ten bits and the traffic slot number requiring two bits. However, it is desirable also to include a call identification number of, say, eight bits, for the following reason. When a secondary station participating in a group call is temporarily out of radio contact with all of the primary stations transmitting the call, for example in a tunnel, the call may end without that unit being aware of it. On re-establishing radio contact the secondary station may start participating in a new call which has been set-up on the same channel and which is of no interest to the operator of the unit. If a call identification number is included, the secondary station would be able to determine, almost as soon as radio contact is re-established, that the call had ended. Including a call identification number, approximately 20 bits are thus required to be transmitted, together with, for example, 10 further bits of redundancy as is well known in the art to give a total of 30 bits.

The following are four possibilities for the location of the alternative site information.

i) Dedicated Frame—a complete frame F is reserved for the alternative primary station signalling at a regular interval, for example once per multiframe. Such a technique has the advantage that all of the alternative station identities or channel frequencies can be transmitted together which should simplify system administration but with the drawback that voice or data message channel space is reduced. This drawback may be reduced by having a less-frequent dedicated frame. The dedicated frame need not be transmitted at a particular interval since the frame could contain a label in the control slot identifying it as an alternative site identification frame. Thus, should spare capacity become available on the system, a frame dedicated to alternative station signalling can be transmitted.

ii) Within the Control Slot—the control slot is 240 bits in length and despite having to contain call requests and acknowledgements, it should usually be possible to arrange for one alternative station identity to be included therein. Each frame may contain up to four different calls so the particular call to which the alternative station identity related would need to be identifiable. One possible technique would be a further two-bit identifier to enable the secondary stations to determine to which of the four calls in the traffic slots the alternative station identity was related.

iii) In the Ramp Slot—the ramp slot R is 40 bits long and is thus long enough to contain one alternative station identity. The primary station, which is transmitting continuously, does not require a ramp slot since the transmitter does not power up and down periodically as does the transmitter in a secondary station. Since there is a ramp slot for every traffic slot T, the alternative site information can be transmitted immediately before the call to which it relates and thus no further call identification is required.

iv) In the Associated Control Slot—use of the associated control slot AC, like the ramp slot, requires no additional call identification but, in the example shown, is possibly too short at 24 bits to convey all of the information required. One solution is to omit the call identification and another would be to transmit the identity of each alternative station over two consecutive frames. In other system configurations the AC slot may be large enough to accomodate all of the information required.

The options (ii), (iii) and (iv) require that the alternative primary station identities are transmitted one at a time and some means (56 in FIG. 2) will be required to supply these in this manner. Option (i) requires that all of the alternative site identities are transmitted together and thus such means may be omitted.

From reading the present disclosure, other modifications will be apparent to persons skilled in the art. Such modifications may involve other features which are already known in the design, manufacture and use of telecommunication systems and component parts thereof, and which may be used instead of or in addition to features already described herein without departing from the scope of the ensuing claims.

I claim:

1. A telecommuncations system comprising a plurality of geographically separate primary stations, each primary station having transmitting means and receiving means, and at least one secondary station having transmitting means and receiving means; the system providing concurrent transmission of the same group call by at least two of the primary stations and reception thereof by said secondary station from only one of the transmitting primary stations at a time during the group call; characterized in that:

each primary station which is transmitting said group call includes therewith information identifying at least another of the primary stations which are transmitting said group call;

said secondary station derives from the identifying information included with said group call as received from one of the transmitting primary stations the identity of an alternative primary station which is transmitting the same group call; and said secondary station comprises storage means for storing the identity of said alternative primary station.

2. A telecommunications system as claimed in claim 1, wherein said group call includes a time interval during which the transmission power of a transmitting primary station can be adjusted, and the information identifying an alternative primary station is provided in said time interval of said group call as transmitted by each of the transmitting primary stations.

3. A primary station for use in a telecommunications system wherein said primary station is one of a plurality of geographically separate primary stations, said system also comprising at least one secondary station; said primary station comprising transmitting means for transmission of a group call concurrently with transmission of the same group call by each of said plurality of primary stations; characterized in that said primary station comprises means for including with a group call transmitted by said primary station information identifying at least one other of the plurality of primary stations which are concurrently transmitting said group call.

4. A primary station as claimed in claim 3, wherein said group call has an identity and said primary station further comprises means for including said identity in the group call transmitted by said primary station.

5. A primary station as claimed in claim 3, wherein said group call includes a time interval during which the transmission power of said primary station can be adjusted, and the information identifying at least one other of the primary stations transmitting said group call is provided in said time interval of said group call.

6. A secondary station for use in a telecommunications system comprising a plurality of geographically separate primary stations which concurrently transmit the same group call, each primary station including with a group call transmitted thereby information identifying an alternative primary station which is transmitting the same group call; said secondary station comprising receiving means for receiving a group call from a first primary station, means for deriving from the identifying information included with the group call received from said first primary station the identity of an alternative primary station which is transmitting the same group call, and channel storage means for storing the identity of said alternative primary station.

7. A secondary station as claimed in claim 6, further comprising: means for detecting and storing a quality value of the group call received from said first primary station; and means which, when said quality value falls below a predetermined criterion, controls the receiving means of said secondary station to continue reception of said group call from said alternative primary station.

8. A secondary station as claimed in claim 6, further comprising: means for detecting and storing a quality value of the group call as received from said first primary station; and means for detecting and storing a corresponding quality value of said group call as received from said alternative primary station.

9. A secondary station as claimed in claim 8, further comprising means which, when the detected quality of the group call as received from said first primary station falls below a predetermined criterion, (i) compares said quality value with the quality value of said group call as received from said alternative primary station, and (ii) controls the receiving means of said secondary station to continue reception of said call from said alternative primary station when that provides a better quality value.

10. A secondary station as claimed in claim 9, wherein reception of the group call is continued from said first primary station until the quality value falls at least a predetermined amount below the quality value of said group call as received from said alternative primary station.

* * * * *